United States Patent
Munz et al.

(10) Patent No.: US 7,559,255 B2
(45) Date of Patent: Jul. 14, 2009

(54) CONNECTION ELEMENT

(75) Inventors: Michael Munz, Reutlingen (DE);
Helmut Grutzeck, Maehringen (DE);
Johann Wehrmann, Balingen (DE);
Conrad Haeussermann, Sonnenbuehl (DE); Klaus Kasten, Reutlingen (DE);
Uwe Schiller, Tuebingen (DE); Konrad Dirscherl, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 10/593,914

(22) PCT Filed: Jan. 18, 2005

(86) PCT No.: PCT/EP2005/050191

§ 371 (c)(1),
(2), (4) Date: Apr. 30, 2007

(87) PCT Pub. No.: WO2005/092662

PCT Pub. Date: Oct. 6, 2005

(65) Prior Publication Data

US 2008/0034896 A1   Feb. 14, 2008

(30) Foreign Application Priority Data

Mar. 25, 2004   (DE) ................. 10 2004 014 670
Apr. 28, 2004   (DE) ................. 10 2004 020 680

(51) Int. Cl.
*G01N 3/02*   (2006.01)
(52) U.S. Cl. .......................................... 73/856; 73/760
(58) Field of Classification Search .................... 73/780,
73/855–860, 760
See application file for complete search history.

(56) References Cited

U.S. PATENT DOCUMENTS

| 3,593,237 | A * | 7/1971 | Lekhtman et al. | 335/222 |
| 5,331,278 | A * | 7/1994 | Evanson et al. | 324/232 |
| 5,339,699 | A | 8/1994 | Carignan et al. | |
| 5,565,770 | A * | 10/1996 | Jones | 324/207.24 |
| 6,150,810 | A * | 11/2000 | Roybal | 324/244 |
| 6,184,680 | B1 * | 2/2001 | Shinoura et al. | 324/252 |
| 6,208,884 | B1 * | 3/2001 | Kumar et al. | 600/409 |
| 6,214,019 | B1 * | 4/2001 | Manwaring et al. | 606/130 |
| 6,681,131 | B2 * | 1/2004 | Yokosawa et al. | 600/409 |
| 7,304,475 | B2 * | 12/2007 | Kautz | 324/244 |
| 7,357,419 | B2 * | 4/2008 | Kock et al. | 280/801.1 |
| 2006/0171579 | A1 * | 8/2006 | Lee et al. | 382/141 |
| 2007/0137916 | A1 * | 6/2007 | Kaiser et al. | 180/271 |

FOREIGN PATENT DOCUMENTS

| DE | 101 11 020 | 9/2002 |
| DE | 102 29 020 | 1/2004 |
| WO | WO02/070906 | 9/2002 |
| WO | WO2004/003501 | 1/2004 |

* cited by examiner

*Primary Examiner*—Max Noori
(74) *Attorney, Agent, or Firm*—Kenyon & Kenyon LLP

(57) ABSTRACT

A connection element and a method for positioning a magnetic field sensor suite into the zero line of a magnetic field is provided, the measuring of the force being achieved by a displacement between a magnet and the magnetic field sensor suite. The magnetic field sensor suite is supported on a holder in such a way that the magnetic field sensor suite is achieved into the zero line of the magnetic field of the magnet.

9 Claims, 4 Drawing Sheets prior to adjustment 18  19 following adjustment

CONNECTION ELEMENT

FIELD OF THE INVENTION

The present invention relates to a connection element and a method for positioning a magnetic field sensor suite into a zero line of a magnetic field of a magnet in a connection element.

BACKGROUND INFORMATION

German Patent Application No. DE 101 11 020 A1 describes a connection element which is configured for the measurement of force, preferably in a vehicle seat, in which the displacement between a Hall-effect sensor and a magnet provoked by the introduction of force is measured as a measure of the force.

SUMMARY

An example connection element according to the present invention, or example method for positioning a magnetic field sensor suite according to the present invention may have the advantage that an alignment, i.e., the positioning of the magnetic field sensor suite into the zero line of the magnet, is simple and reliable. In the manufacture, in particular, such a simple alignment of the sensor is necessary for cost-effective production. According to an example embodiment of the present invention, a holder which is easy to move so as to ascertain the zero line by simultaneous electrical measurement at the magnetic field sensor suite, is provided for this purpose. The method according to the present invention is able to be automated, in particular. If the adjustment was detected, the holder is fixated on the connection element, preferably by laser welding. The magnetic field sensor suite is mounted on the holder as Hall-effect sensor.

It may be especially advantageous if the holder may be displaced only linearly, the clearance between the magnetic field sensor suite and the magnet remaining constant. In this way the magnetic field sensor suite, which is preferably a Hall-effect sensor provided in the form of an integrated switching circuit, is moved in one plane only, so that it is very easy to find the zero line. The linear displacement in one plane is made possible by a spring element of the holder. This spring element is preferably part of a sheet which is integrated in a plastic part of the holder. The spring element has the function of disallowing any play for the holder once it has been installed in the connection element, but still allowing it to be moved by applying light force. Corresponding actuators may be used for this purpose. However, this adjustment may also be done manually.

As an alternative, the holder may advantageously allow the positioning of the magnetic field sensor suite into the zero line by a rotation. The holder has a round form in one region to make this possible. The round form preferably has deformable webs that allow the holder to be inserted without play in a borehole of the connection element. By rotating the holder, the magnetic field sensor suite may then be rotated into the zero position, thereby accomplishing the adjustment.

The holder advantageously has a symmetrical design which allows a largely stress-free configuration. Since the Hall-effect sensor as IC is mounted directly on the inserts, a decoupling of the Hall-IC from the plastic parts is achieved. This reduces possible mechanical tension that may arise from different temperature coefficients of the various components across the temperature range. The contacts of the Hall-effect sensor or, alternatively, the inserts, are formed such that a difference in height between the inserts and the Hall contacts is bridged.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

The use of seat force sensors to characterize an object on the seat with respect to its weight force and weight-force distribution is growing. Such seat force sensors may preferably be connection elements that are installed in the seat frame in place of bolts or screws and which are configured in such a way that they are able to ascertain the weight force exerted on the seat. The displacement of a magnet with respect to a magnetic field sensor suite, which is preferably a Hall-effect sensor, is utilized for this purpose. Decisive for the function of this seat force sensor is that the magnetic field sensor suite is in the zero line of the magnet in the unloaded state, that is to say, exhibits no displacement. The connection element is made up of an inner bending element and an outer sleeve, which is welded sealingly and tightly at one end. This assembly is the active element of the connection element. Inside the connection element, the displacement by application of force is recorded by a Hall-effect sensor. Because of the tolerances of the components and the installation, a precise positioning of the magnet with respect to the Hall-effect sensor so that the measuring element of the Hall-effect sensor lies precisely in the zero line of the magnetic field of the magnet, is generally not possible.

The example holder as described according to the present invention is used to align the magnetic field sensor suite in the production.

The holder is configured and placed in such a way that a simple alignment of the sensor, i.e., the connection element, in the zero position of the magnetic field is possible in the production.

Figure 1:
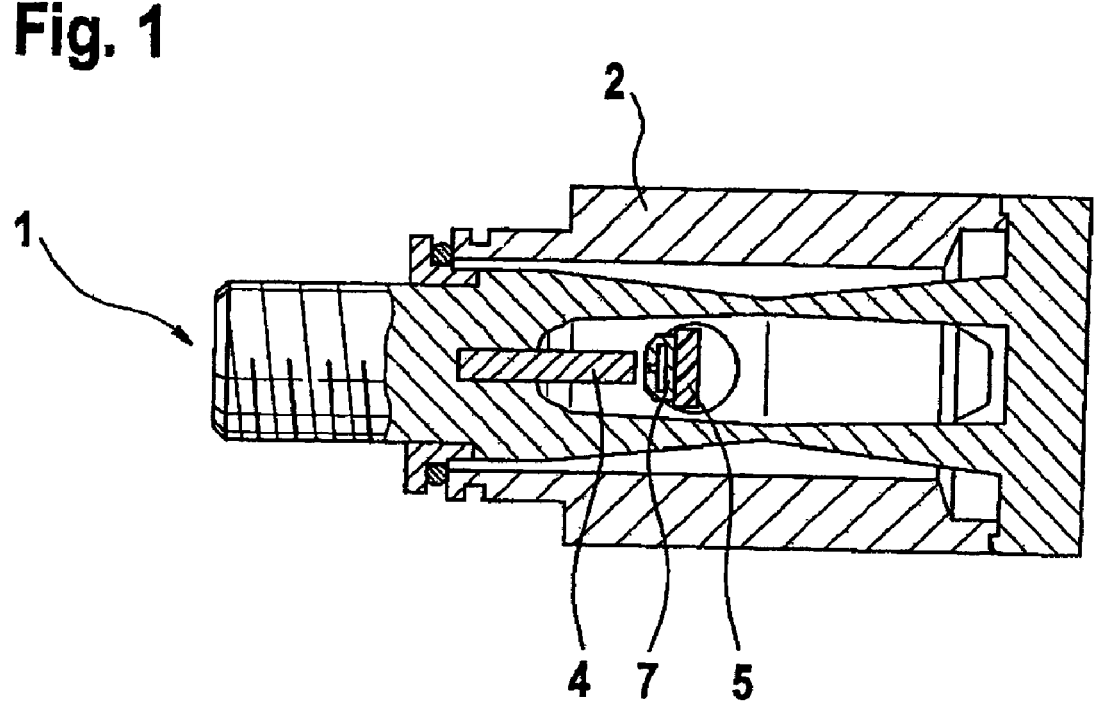
FIG. 1 shows view of an example connection element.
Figure 2:
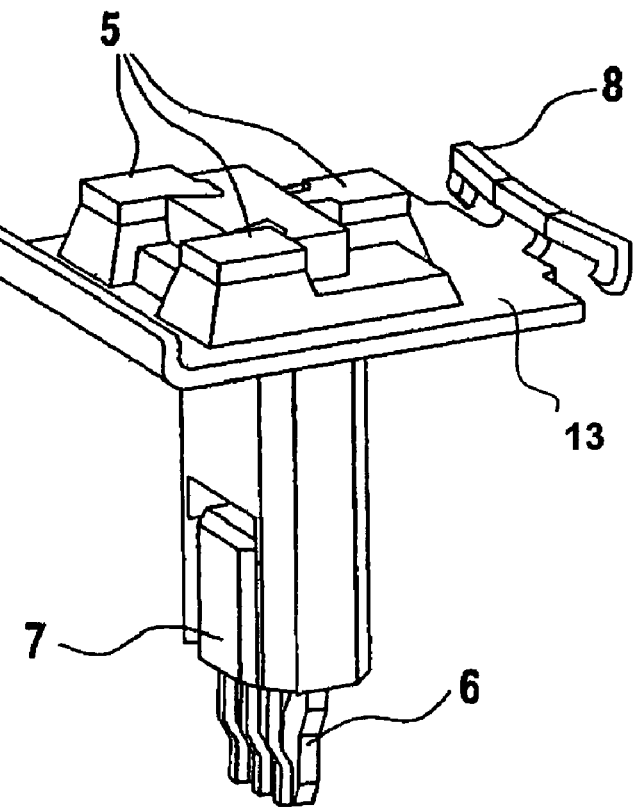
FIG. 2 shows holder for the magnetic field sensor suite.
Figure 3:
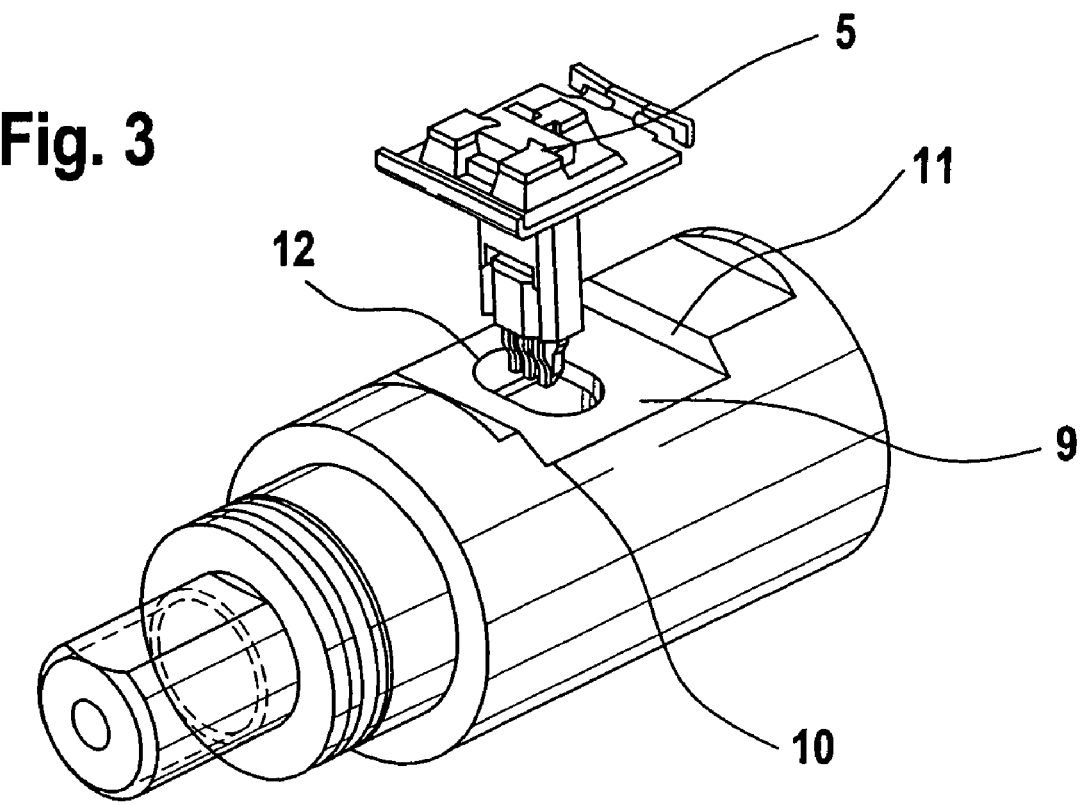
FIG. 3 shows view of the holder while being installed.

The active element or the spring of the seat force sensor is made up of a bending element 1, which is embodied as double bending bar, of a sleeve 2 welded thereto. This can be seen in FIG. 1. FIG. 1 shows a view of the connection element. Affixed on bending element 1 is a magnet 4. Sleeve 2 has at its circumference a milled-out region 9, i.e., a groove and an elongated hole 12, so that holder 5 with magnetic field sensor 7, that is to say, the Hall-IC, is able to be introduced into sleeve 2, and Hall-IC 7 is installed in front of magnets 4. Holder 5 is made up of a plastic part into which a sheet 13 and inserts 6 are injected. Inserts 6 convey the signals of the magnetic field sensor suite to the outside, to three contact surfaces. Sheet 13 is used both as limit stop for restricting the depth, and as limit stop with respect to the sleeve or groove 10. (FIG. 3 and FIG. 2). In addition, sheet 13 has an integrated spring element 8, so that sheet 13 is wedged in the groove, but is still able to be displaced using light force. Because of the spring, holder 5 is placed at edge 10 without play, thereby keeping the clearance between magnetic field sensor suite 7 and magnet 4 constant during the adjustment as well. After the adjustment, sheet 13 is permanently connected to sleeve 2 by laser or resistance welding.

First, the connection element is inserted into the elongated hole of the sleeve, so that the sheet lies on the flattened region (groove) of the sleeve in a flush manner. The rounded regions on the spring elements facilitate the insertion of the sheet into the groove, so that the springs press the sheet against the opposite side (without play).

Then, a fitting holding device into which three flexible contact pins have been introduced is placed on top from "above". These contact pins make contact on the three contact surfaces and press the connection element onto the flattened region by their spring force. At the same time, the device grips the sheet or the plastic of the connection element on the two free sides.

Using the device, the connection element is then pushed to the limit stop, or away from it, to one side, so that the Hall IC is safely outside the zero line.

Then, while monitoring the signal at the same time, the connection element is pushed in the direction of the center until the output signal corresponds to the center (is zero). In this position the sheet is then welded to the sleeve by laser welding, whereupon the device is removed.

A similar operation is carried out for the variant with rotational adjustment, but a rotary movement is used instead of a sliding movement.

Figure 4:
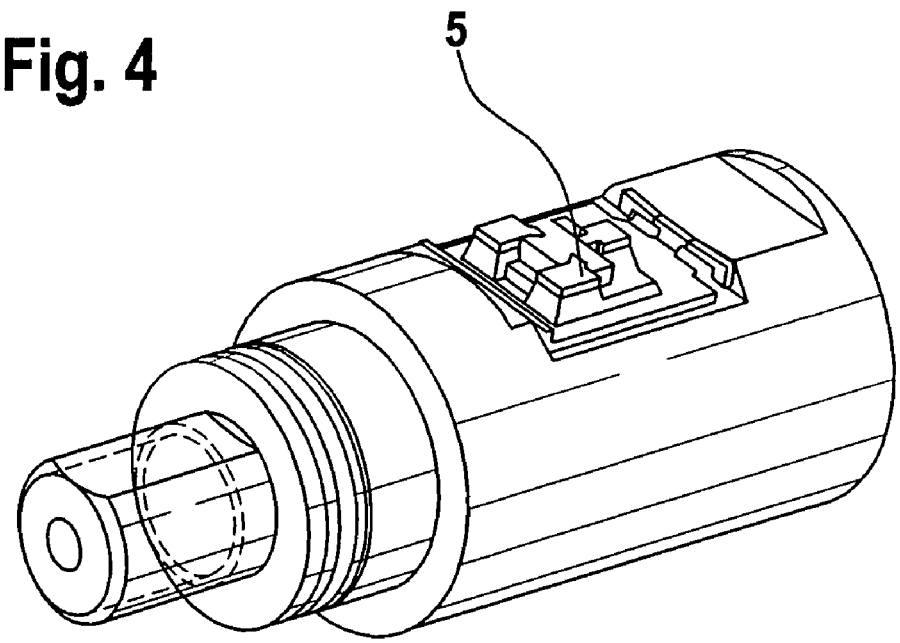
FIG. 4 shows the holder installed in the connection element.
Figure 5:
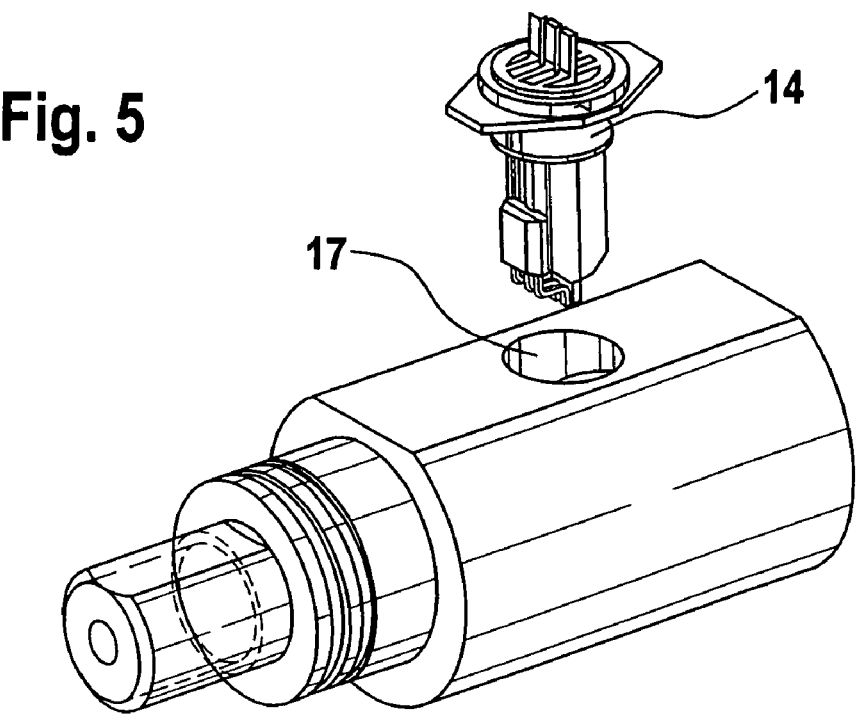
FIG. 5 shows another view of the holder while being installed.
Figure 6:
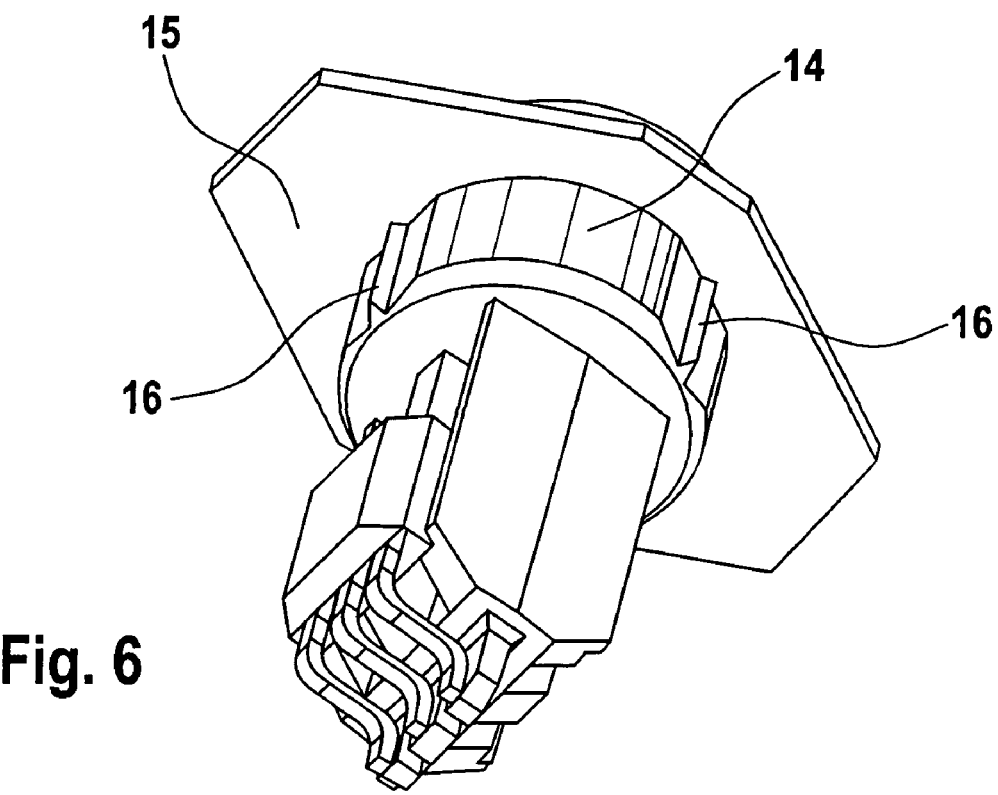
FIG. 6 shows holder having a round form.

FIG. 4 shows mounted holder 5 in elongated hole 12 in a side view. The connection element may now be installed and electrically connected. FIG. 5 shows an alternative holder during installation in the connection element. The holder has a rounded region 14 via which it is inserted in a borehole 17. Rounded region 14 is situated below a sheet 15 as shown in FIG. 6. At the periphery of rounded region 14 are at least three webs 16, which are deformable and allow the holder to be inserted into borehole 17 without play. Borehole 17 is introduced in sleeve 2.

Figure 7A:
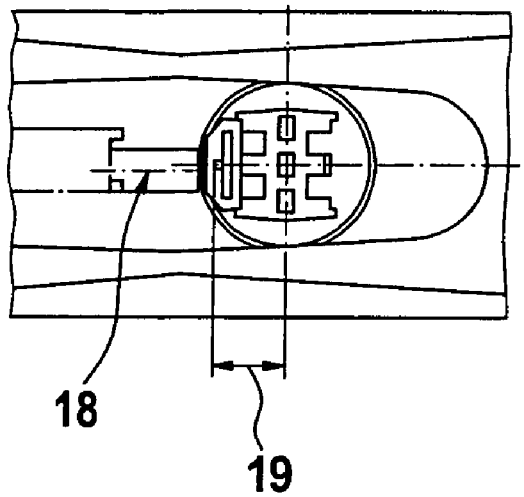
FIGS. 7*a* and *b* show the alignment by rotating the holder.
Figure 7B:
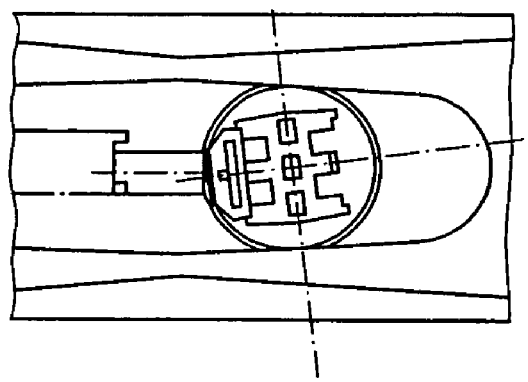

FIGS. 7*a* and *b* show the adjustment by rotation of the holder. Reference numeral 19 in FIG. 7*a* denotes the clearance between the holder and the holder's center of symmetry. The zero position is denoted by reference numeral 18. A clear difference between space 19 and zero line 18, which must be remedied by the adjustment, can be seen in FIG. 7*a*. Space 19 of the holder away from the center of symmetry of the holder is dimensioned such that during the adjustment the magnetic field sensor suite is rotated into zero position 18 of the magnetic field by turning the holder. This has happened in FIG. 7*b*. The magnetic field sensor suite is now adjusted.

Figure 8:
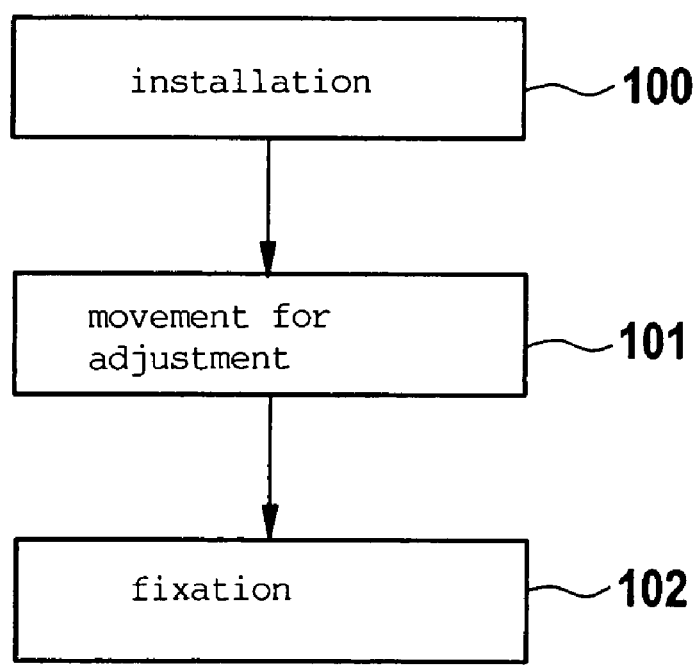
FIG. 8 shows a flow chart.

FIG. 8 elucidates the method according to the present invention in a flow chart. In method step 100, the holder is installed in the sleeve. In method step 101, the adjustment takes place by the movement of the holder in the sleeve. A linear displacement or a rotation of the holder may be implemented in the process. A combination of these two types of movement is possible as well. If the adjustment was detected, the holder will be fixated in the sleeve in method step 102, so that the fixation of the adjustment is permanent. This fixation is preferably achieved by laser or resistance welding. In the linear displacement, sheet 13, for instance, may be used for the welding.

What is claimed is:

1. A connection element configured for measuring force by a displacement between a magnet and a magnetic field sensor, comprising:
   a holder, including the magnetic field sensor,
   wherein the holder supports the magnetic field sensor in such a way that the magnetic field sensor is positioned into a zero line of a magnetic field of the magnet by a movement of the holder,
   wherein the holder has a spring element so that when the holder is moved by a linear displacement, a clearance between the magnet and the magnetic field sensor is kept constant.

2. The connection element as recited in claim 1, wherein the spring element is part of a sheet, the sheet being integrated in a plastic part of the holder.

3. The connection element as recited in claim 1, wherein the holder has a rounded form in at least one region, so that the holder is moved by a rotation.

4. The connection element as recited in claim 3, wherein the holder has at least three deformable webs in the region.

5. The connection element as recited in claim 1, wherein the holder has a symmetrical design and includes inserts to which a magnetic field sensor suite is directly connected.

6. A method for positioning a magnetic field sensor into a zero line of a magnetic field of a magnet in a connection element used for measuring force by a displacement between the magnet and the magnetic field sensor suite, comprising:
   moving a holder on which the magnetic field sensor is situated in such a way that the magnetic field sensor is positioned into the zero line; and
   affixing the holder with the connection element,
   wherein the holder has a spring element so that when the holder is moved by a linear displacement, a clearance between the magnet and the magnetic field sensor is kept constant.

7. The method as recited in claim 6, further comprising:
   joining the holder to the connection element by laser welding.

8. The connection element as recited in claim 2, wherein the spring element is attached to an edge of the sheet.

9. The connection element as recited in claim 2, wherein the magnet field sensor is attached to a column attached to the sheet, an axis of the column being substantially perpendicular to a surface plane of the sheet.

* * * * *